United States Patent
Ljung et al.

(10) Patent No.: US 10,149,345 B2
(45) Date of Patent: Dec. 4, 2018

(54) APPARATUS, SYSTEMS AND METHODS FOR DISCONTINUOUS SIGNALING IN A MOBILE COMMUNICATION NETWORK

(71) Applicant: Sony Corporation, Tokyo (JP)

(72) Inventors: Rickard Ljung, Helsingborg (SE); Bo Larsson, Lund (SE); Olof Zander, Södra Sandby (SE); Vanja Plicanic Samuelsson, Lund (SE); Basuki Priyanto, Lund (SE)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 14 days.

(21) Appl. No.: 14/711,149

(22) Filed: May 13, 2015

(65) Prior Publication Data
US 2016/0286602 A1    Sep. 29, 2016

Related U.S. Application Data

(63) Continuation of application No. PCT/EP2015/056400, filed on Mar. 25, 2015.

(51) Int. Cl.
*H04W 76/28* (2018.01)
*H04W 52/02* (2009.01)
*H04W 72/12* (2009.01)

(52) U.S. Cl.
CPC ....... *H04W 76/28* (2018.02); *H04W 52/0209* (2013.01); *H04W 52/0216* (2013.01);
(Continued)

(58) Field of Classification Search
CPC ............ H04W 52/02; H04W 52/0209; H04W 52/0212; H04W 52/0216; H04W 52/0225;
(Continued)

(56) References Cited

U.S. PATENT DOCUMENTS

| 6,643,272 B1 | 11/2003 | Moon et al. | |
|---|---|---|---|
| 2003/0152049 A1* | 8/2003 | Turner | H04L 12/12 370/331 |

(Continued)

OTHER PUBLICATIONS

International Search Report and Written Opinion; dated Nov. 12, 2015; issued in International Patent Application No. PCT/EP2015/056400.

*Primary Examiner* — Khoa Huynh
(74) *Attorney, Agent, or Firm* — Tucker Ellis LLP; Ross Kowalski; Morris Galin

(57) ABSTRACT

The invention is directed to systems, methods and computer program products for discontinuous signaling in a mobile communication network. User equipment (UE)/mobile terminal requests slotted transmissions and, in response to the network authorizing slotted transmissions, communication of subsequent UE transmissions are slotted, such that a minimum time period is required to elapse between each UE transmission. In specific embodiments of the invention the minimum time period is a predetermined time period known in advance to the user equipment and network. In other embodiments of the invention the user equipment slotted transmission requests includes a requested minimum time period, which may be approved or revised by the network. In still further embodiments the network, upon receiving the request for slotted transmissions, determines the minimum time period.

11 Claims, 5 Drawing Sheets

(52) U.S. Cl.
CPC ..... H04W 72/1268 (2013.01); *Y02D 70/1242* (2018.01); *Y02D 70/1262* (2018.01); *Y02D 70/142* (2018.01); *Y02D 70/21* (2018.01); *Y02D 70/24* (2018.01); *Y02D 70/25* (2018.01); *Y02D 70/26* (2018.01)

(58) Field of Classification Search
CPC ......... H04W 52/0235; H04W 52/0261; H04W 52/028; H04W 72/1268; H04W 76/04; H04W 76/048; H04W 76/28; Y02D 70/1242; Y02D 70/1262; Y02D 70/142; Y02D 70/21; Y02D 70/24; Y02D 70/25; Y02D 70/26
See application file for complete search history.

(56) References Cited

U.S. PATENT DOCUMENTS

| | | | |
|---|---|---|---|
| 2009/0190538 A1* | 7/2009 | Hasegawa | H04W 76/048 370/329 |
| 2012/0170485 A1* | 7/2012 | Maeda | H04B 7/2643 370/252 |
| 2013/0107780 A1* | 5/2013 | Choi | H04W 52/0209 370/311 |
| 2013/0294311 A1* | 11/2013 | Cai | H04L 1/18 370/311 |
| 2013/0336186 A1 | 12/2013 | Damnjanovic | |

* cited by examiner

APPARATUS, SYSTEMS AND METHODS FOR DISCONTINUOUS SIGNALING IN A MOBILE COMMUNICATION NETWORK

FIELD OF THE INVENTION

In general, embodiments of the invention relate to mobile communication network communications and, more particularly, providing for discontinuous signaling (i.e., slotted transmissions) in a mobile communication network.

BACKGROUND

Mobile terminals, otherwise referred to herein as User Equipment (UE), in mobile telecommunication (i.e., cellular) systems are prone to utilizing relatively high transmit output power. In mobile telecommunication networks, such as Wideband Code Division Multiple Access (WCDMA) and Long Term Evolution (LTE), the typical output power is in the order of approximately 23 dBm (decibels-milliwatts). In order to produce such a high level of transmit power, the total transmit chain in the cellular modem consumes a relatively high amount of energy. For a conventional battery powered UE with an approximate 3.8V supply voltage, the instantaneous current drain from the modem alone can be in the order of approximately 700-800 mA (i.e., proximately 2.5-3.0 W) during such high output power transmissions.

Global telecommunication standardization initiatives, such as 3GPP ($3^{rd}$ Generation Partnership Project), have included an ongoing effort to define new standards that allow low cost implementations of the cellular modem, e.g., Machine to Machine (M2M) types of service (i.e., services with no human interaction) or the like. Low cost implementations, which characteristically include low data rate usage, simple modem implementation and low total energy consumption, would benefit from the use of inexpensive batteries, such as alkaline or nickel-metal hydride (NiMH) batteries as the power supply instead of the more advanced and expensive batteries used today (e.g., lithium ion batteries). Moreover, even when more advanced batteries are required in the UE, it would still be beneficial to limit the maximum current drain.

The high instantaneous current drain exhibited from current cellular modems in combination with standard alkaline batteries would result in significant battery drain. For example, a pair of single cell cylindrical dry batteries (e.g., AA batteries or the like) could handle 3 W drain; however, the battery capacity would be severely degraded compared to use of a lower instantaneous current.

One solution to handling the problem of high current drains, which is implemented in other types of electronics, is charge a capacitor with a lower current in certain time periods, and subsequently utilized the energy stored in the capacitor during the period of high current drain. However, implementation of such a solution in the context of UEs/mobile terminals would mean that the high current transmitter would be limited in its duty cycle because capacitor recharging would be required between transmissions.

Therefore, a need exists to develop apparatus, systems, methods and the like that will allow for lower instantaneous current drain for battery powered UEs/mobile terminals. By reducing the continuous battery current drain the desired invention will enable less-complex and lower-cost batteries to be implemented in the UEs/mobile terminals.

BRIEF SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for time slotted UE transmission. In accordance with embodiments of the present invention, the initial UE transmission that is transmitted to the network indicates a request for slotted transmission setup, whereby a minimum time period (i.e., time slot) is required to lapse between UE transmissions (e.g., access, connection request, session request transmissions and the like). The benefit realized by having the additional time in between UE transmissions is that a capacitor can be utilized, such that the capacitor is charged between transmissions in order to support the usage of low cost batteries (alkaline, NiMH or the like).

In specific embodiments of the invention, an indicator signaling is included within the initial UE transmission that is configured to request a slotted transmission procedure and the corresponding response from the network will indicate if the request has been granted (i.e., whether the UE has been authorized for slotted transmission). In specific embodiments of the invention, the minimum time period is predetermined (e.g., a fixed time period defined in a standard or the like), such that both the UE and network are aware of the length of the time period prior to the UE requesting slotted transmission. In other embodiments of the invention, the minimum time period is specified by the UE in the initial UE transmission and the network may either approve the requested time period or provide a revised time period. In still further embodiments herein disclosed, the minimum time period is defined by the network and included in the response from the network indicating that the request for slotted transmission has been granted.

A method for discontinuous signaling during a mobile communication network connection setup process defines first embodiments of the invention. The method includes transmitting, from user equipment (UE) to a mobile communication network, an initial UE transmission that includes an indicator signaling that is configured to request slotted UE transmissions. Further the method includes, in response to transmitting the initial UE transmission, receiving, at the UE, a response to the initial UE transmission that authorizes slotted UE transmissions. In addition, the method includes, in response to authorizing slotted UE transmission, slotting communication of each subsequent UE transmission, wherein slotting requires a minimum time to elapse between each UE transmission.

In specific embodiments of the method, the minimum time between each UE transmission is a predetermined minimum time that is known to the UE and the mobile communication network prior to transmitting the initial UE transmission (for example, previously defined in a standard or the like).

In other specific embodiments of the method, transmitting the initial UE transmission further includes transmitting, from the UE to the mobile communication network, the initial UE transmission that includes a request for the minimum time between each UE transmission. In such embodiments of the invention, receiving the response to the initial UE transmission further includes receiving, at the UE, the response to the initial UE transmission that includes the minimum time required to elapse between each UE transmission. In such embodiments of the method, the minimum time value, otherwise referred to as slot time, is dynamically determined/assigned by the network.

In still further specific embodiments of the method, transmitting the initial UE transmission further includes transmitting, from the UE to the mobile communication network, the initial UE transmission that includes a requested minimum time required to elapse between each UE transmission. In such embodiments the method may further included, immediately prior to transmitting the initial UE transmission, dynamically determining the requested minimum time based on one or more of capacitor size, battery type, and current battery charging level. In further related embodiments of the method, receiving the response to the initial UE transmission further comprises receiving, at the UE, the response to the initial UE transmission that provides for one of (1) acceptance of the requested minimum time, or (2) inclusion of a revised minimum time that is different than the requested minimum time. In such embodiments of the method, a specified minimum time value is requested by the UE and the network may either accept the requested minimum time or respond with a different/revised minimum time.

Moreover, in other specific embodiments of the method, the initial UE transmission is an access preamble and slotting requires the minimum time to elapse between transmission of the access preamble and a connection request and requires the minimum time to elapse between the connection request and a session request.

User equipment (UE) apparatus (e.g., mobile communication terminal) for discontinuous signaling during a mobile communication network connection setup process defines second embodiments of the invention. The apparatus includes a memory and a processor in communication with the memory. The apparatus further includes a transmission module that is stored in the memory and executable by the processor. The transmission module is configured to transmit, to a mobile communication network, an initial UE transmission that includes an indicator signal that is configured to request slotted UE transmissions. The module is further configured to, in response to transmitting the initial UE transmission, receive, a response to the initial UE transmission that authorizes slotted UE transmissions, and, in response to authorizing slotted UE transmission, slot communication of each subsequent UE transmission. Slotting requires a minimum time, i.e., a slot time, to elapse between each UE transmission.

A mobile communication network system for discontinuous signaling during a mobile communication network connection setup process defines third embodiments of the invention. The system includes user equipment (UE) terminal that includes a first memory, a first processor in communication with the first memory and a transmission module that is stored in the first memory and executable by the first processor. The transmission module is configured to transmit an initial UE transmission that includes an indicator signal that is configured to request slotted UE transmissions. The system further includes a base station apparatus that includes a second memory and a second processor in communication with the memory. The base station apparatus is configured to, in response to receiving the initial UE transmission; signal a response to the initial UE transmission that authorizes slotted UE transmission. In addition, the transmission module of the UE terminal is configured to, in response to the UE terminal receiving the response, slot communication of each subsequent UE transmission.

Thus, systems, apparatus, methods, and computer program products herein described in detail below provide for requesting slotted UE transmissions during connection setup process. The slotted process, which requires a minimum time period between UE transmissions, allows for lower instantaneous current drain for battery powered UEs. As such, the present invention enables the use of lower cost battery solution in mobile UEs.

BRIEF DESCRIPTION OF THE DRAWINGS

Figure 1:
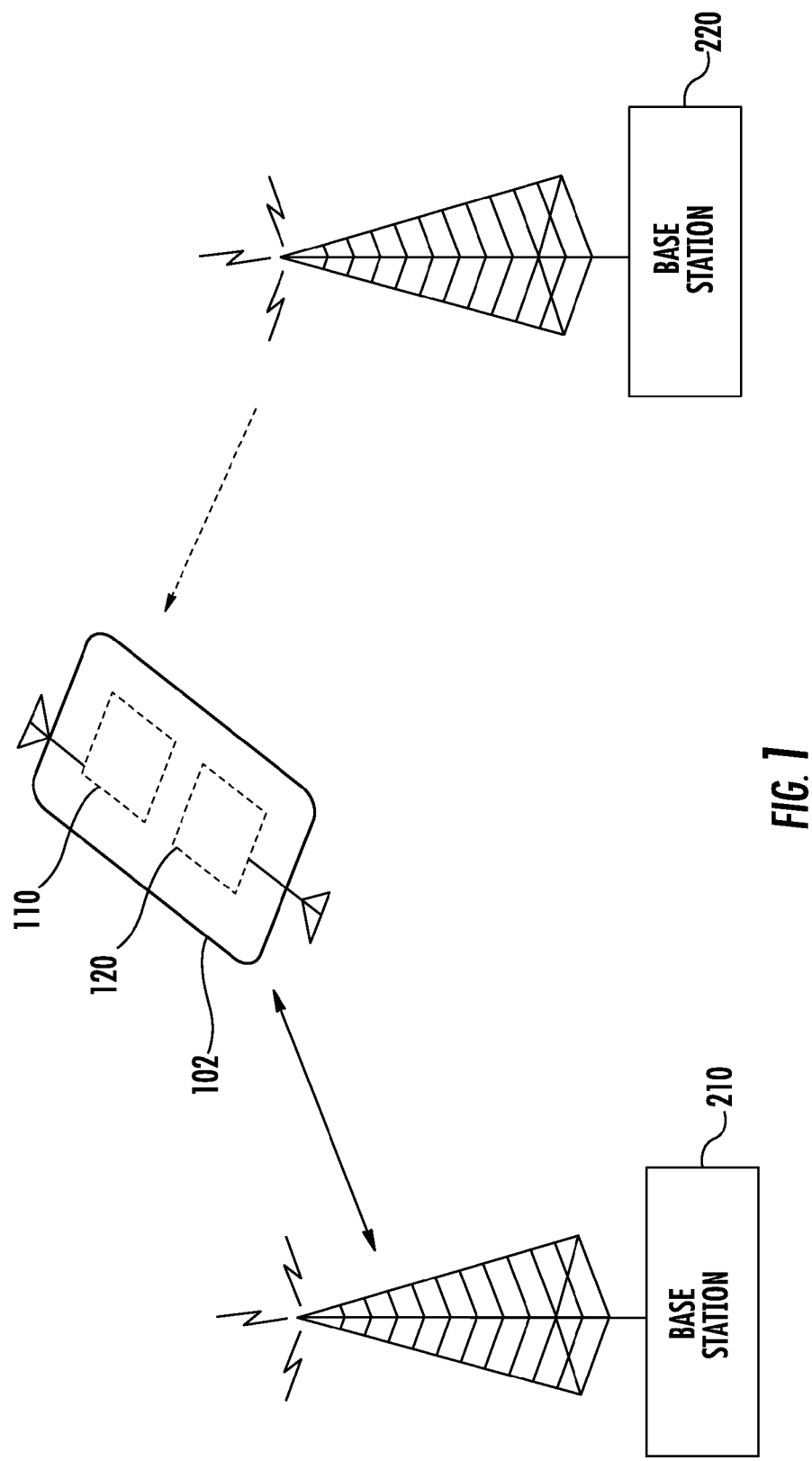
Figure 2:
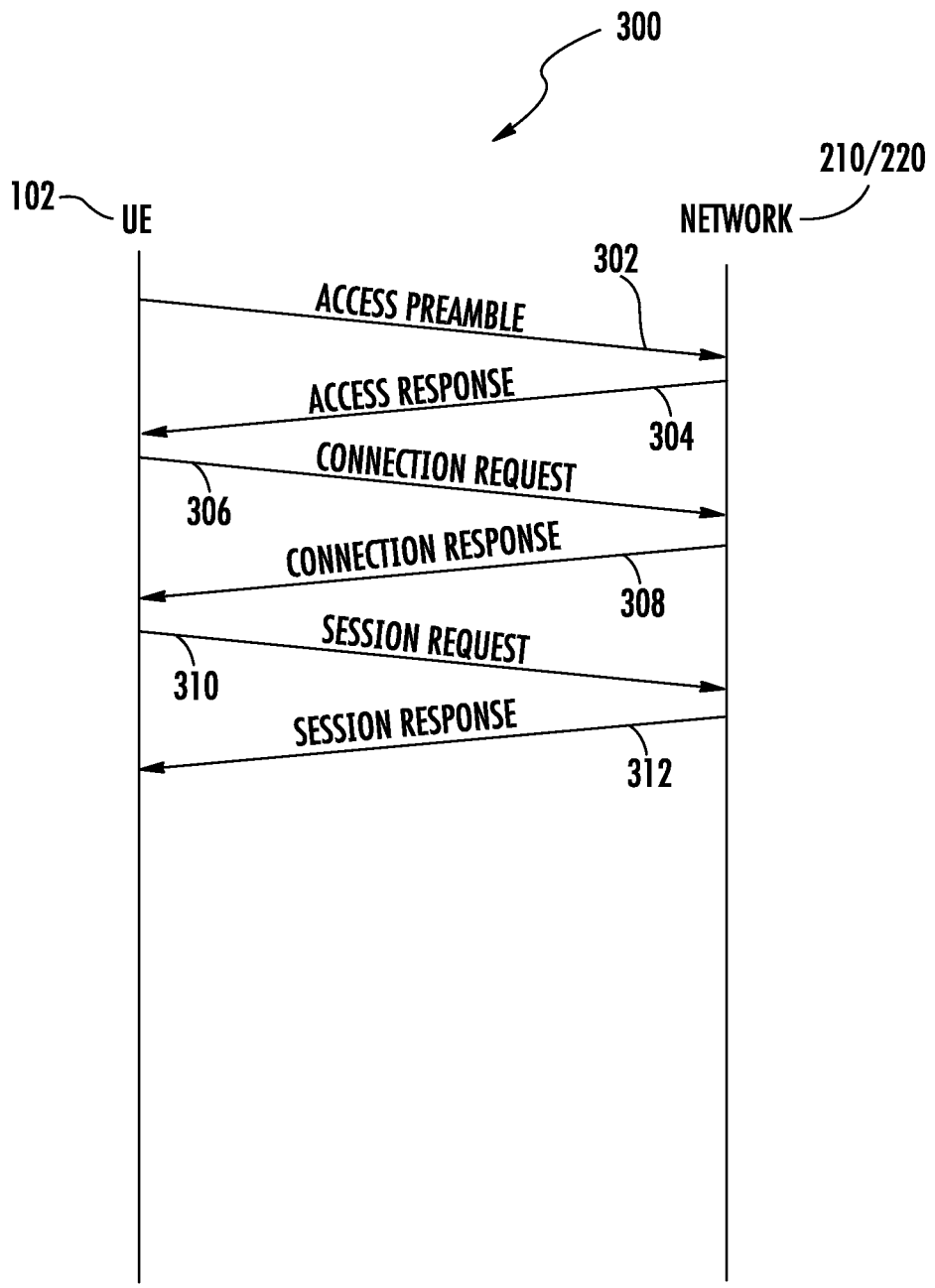
Figure 3:
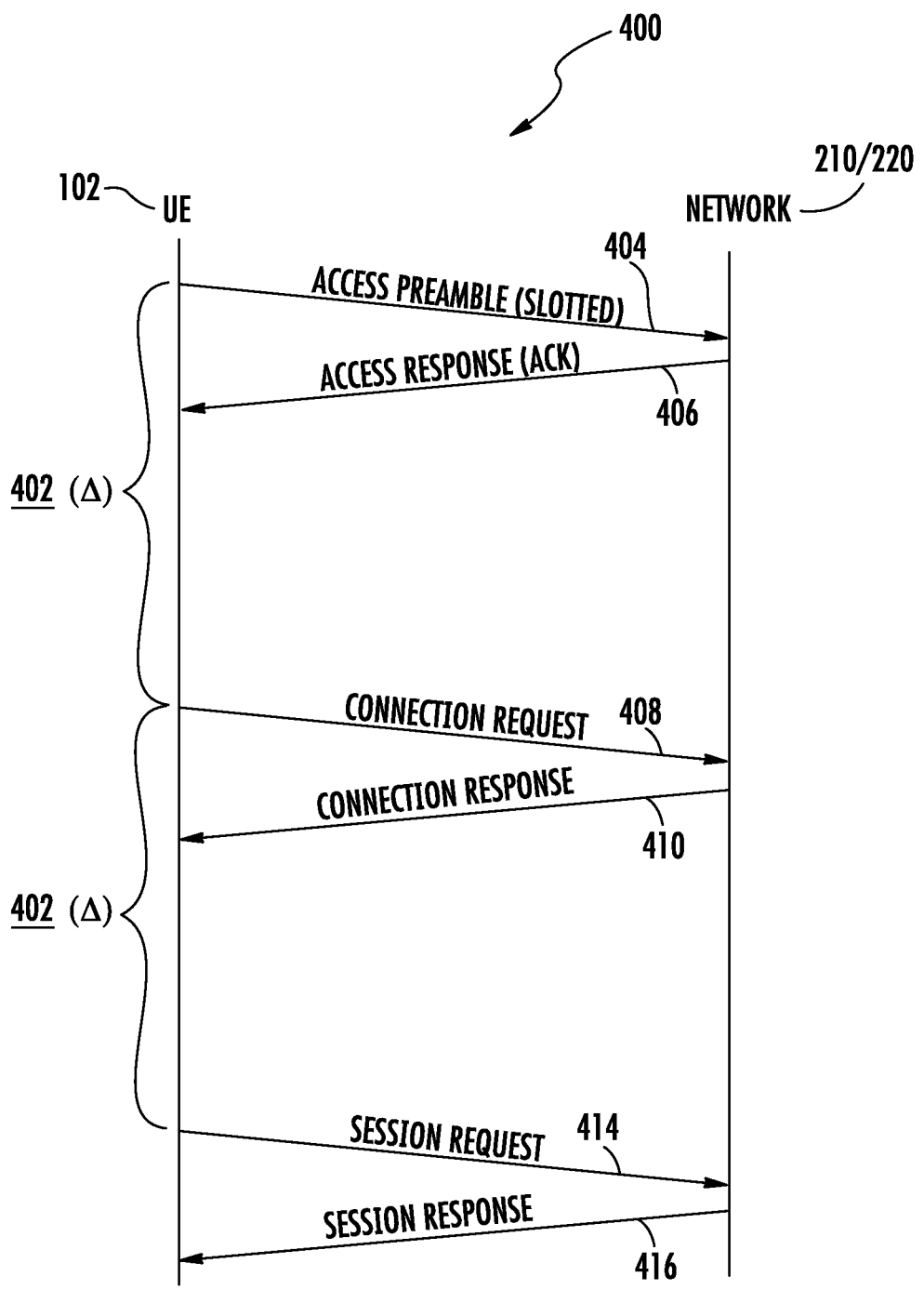
Figure 4:
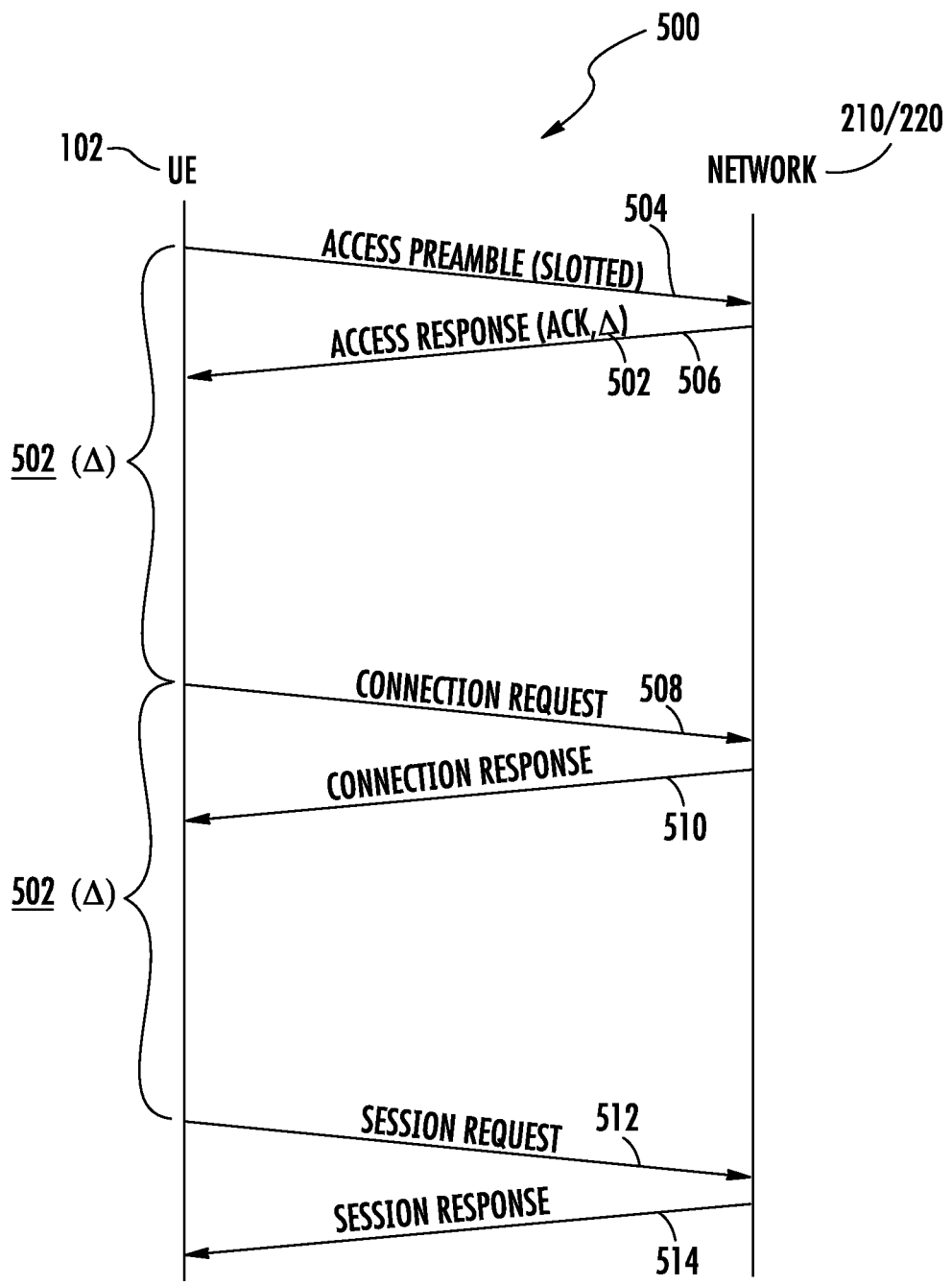
Figure 5:
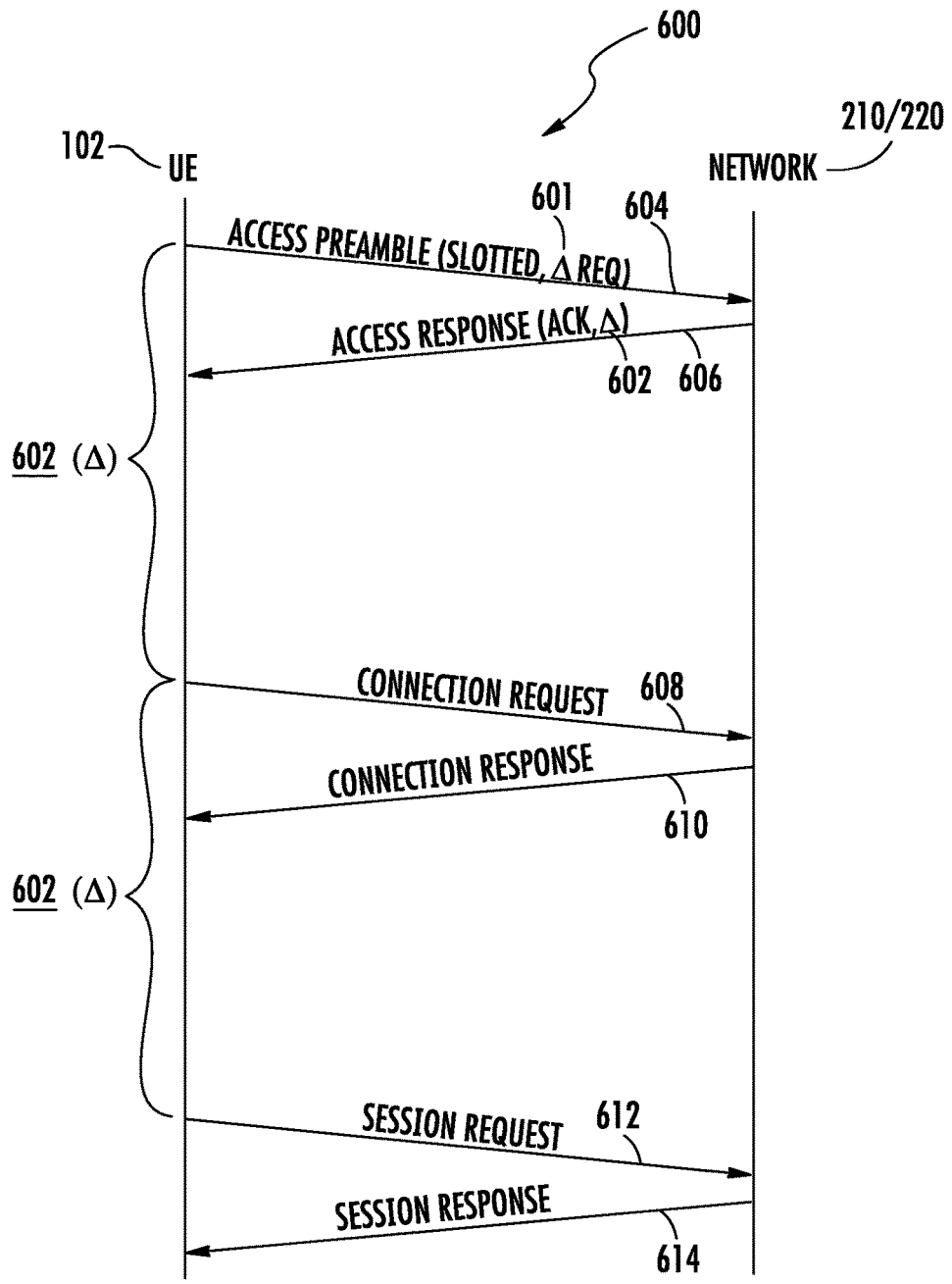

Having thus described embodiments of the invention in general terms, reference will now be made to the accompanying drawings, where:

FIG. 1 is a schematic diagram of a mobile communication network environment, in accordance with embodiments of the present invention;

FIG. 2 is messaging diagram illustrating a conventional mobile communication connection setup process, in accordance with the prior art;

FIG. 3 is a messaging diagram illustrating a mobile communication connection setup process implementing slotted transmissions, in which the minimum time between UE transmissions is known prior to the initial UE transmission, in accordance with embodiments of the present invention;

FIG. 4 is a messaging diagram illustrating a mobile communication connection setup process implementing slotted transmissions, in which the minimum time between UE transmissions is designated by the network in response to the initial UE transmission, in accordance with embodiments of the present invention; and FIG. 5 is a messaging diagram illustrating a mobile communication connection setup process implementing slotted transmissions, in which the minimum time between UE transmissions is specified in the initial UE transmission, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

A device may be referred to as a node or user equipment ("UE"). For the purpose of sending or receiving data, the device may connect to a wireless local area network ("WLAN") or a mobile communication network (including evolution of 3GPP) LTE releases and $5^{th}$ Generation ("5G") LTE releases). Any network described herein may have one or more base stations ("BS") and/or access points ("AP").

As discussed in detail herein, the present invention provides for time slotted UE transmission. In accordance with embodiments of the present invention, the initial UE transmission that is transmitted to the network indicates a request for slotted transmission setup, whereby a minimum time period (i.e., time slot) is required to lapse between UE transmissions (e.g., access, connection request, session request transmissions and the like). In specific embodiments, a network scheduler insures that the minimum time period is adhered to by the UE (i.e., transmissions do not occur until the time period has lapsed). The benefit realized by having the additional time in between UE transmissions is that a capacitor can be utilized, such that the capacitor is charged between transmissions in order to support the usage of low cost batteries (alkaline, NiMH or the like).

In specific embodiments of the invention, an indicator signaling is included within the initial UE transmission that is configured to request a slotted transmission procedure and the corresponding response from the network will indicate if the request has been granted (i.e., whether the UE has been authorized for slotted transmission In specific embodiments of the invention, the minimum time period is predetermined (e.g., a fixed time period defined in a standard or the like), such that both the UE and network are aware of the length of the time period prior to the UE requesting slotted transmission. In other embodiments of the invention, the minimum time period is requested by the UE in the initial UE transmission and the network may either approve the requested time period or provide a revised time period. In still further embodiments herein disclosed, the minimum time period is defined by the network and included in the response from the network indicating that the request for slotted transmission has been granted.

As a means of providing context to present embodiments of the invention, FIG. 1 depicts a schematic diagram of mobile communication network environment 100 with a mobile terminal, i.e., User Equipment (UE) 102, a first base station 210 and a second base station 220. Depending on the type of used radio access technology, the base stations may be implemented, e.g., as a Node B of a UMTS network, as an evolved Node B (eNB) of an LTE network, or as a base station of a GSM (Global System for Mobile Communications) network. In the scenario of FIG. 1 it is assumed that the UE 102 is connected via a radio link to the base station 210, which is illustrated by a solid double-headed arrow. For example, there could be an ongoing data session or voice session established via the base station 210 to the UE 102. Further, it is assumed that the UE 102 scans for other base stations and, for this purpose, listens to radio signals from the base station 220, which is illustrated by the dashed arrow. The radio signals transmitted by the base station 210 will typically be on a different frequency than the radio signals transmitted by the base station 220. For receiving the radio signals the UE 102 is provided with a receiver 110, and for transmitting radio signals the UE 102 is provided with a transmitter 120.

Referring to FIG. 2, a connection setup process messaging diagram 300 is depicted that illustrates conventional connection setup process processing between the UE 102 and network (i.e., base station 210 or 220), such as would be performed in an LTE system, in accordance with the prior art. In the illustrated example, the UE 102 transmits an initial UE transmission, i.e., access preamble 302 that is received by the network (i.e., base station 210 or 220). The receiving base station 210 or 220 response to the access preamble 302 with a corresponding access response 304. In response to receiving the access response 304, UE 102 transmits a connection request 306 and the receiving base station 210 or 220 responds with a corresponding connection response 308. In response to receiving the connection response 308, UE 102 transmits a session request 310 and the receiving base station 201 or 220 responds with a corresponding session response 312. The conventional connection setup process of FIG. 2 provides for the time between UE transmissions (i.e., the time between the access preamble 302 and the connection request 306 transmissions and the time between the connection request 306 and the session request 310 transmissions) to be kept as short in duration, as possible, so as to minimize the overall connection time. However, such minimal time between UE transmissions does not provide adequate time to recharge a capacitor between such transmissions.

In accordance with embodiments of the present invention, FIGS. 3-5 depict connection messaging diagrams 400, 500 and 600 in which each UE transmission is separated by a certain minimum amount of time, otherwise referred to herein as the minimum time, minimum time period or slot time. The amount of time is designated in FIGS. 3-5 as "Δ" and may (but is not limited to) be in the order of about 10 milliseconds to about 1000 milliseconds. The benefit of having the additional time in between UE transmissions is that the capacitor can be charged between transmissions and energy stored therein can support the UE transmissions; thereby, providing support for usage of lower cost batteries. It should be noted that the mobile communication connection setup processes shown in FIGS. 3-5 are, in general, intended for data transmissions that are insensitive to time. In this regard, embodiments of the present invention may be especially suited, but not limited to, machine-to-machine (M2M) type of services or the like.

It should be noted that unlike other existing discontinuous transmission processes, such as LTE DRX/DTX (Long Term Evolution Discontinuous Reception/Transmission) in which the UE is allowed to switch off the reception chain when there is no data to transmit, the present invention provides for a minimum time period (i.e., the time between UE transmissions are ensured to be at least a certain time period "Δ". As such, the reception chain is not switched off during the periods of inactivity and, therefore, the UE is still capable of receiving and processing signals from the network.

Referring to FIG. 3, a connection setup process messaging diagram 400 is depicted that illustrates a mobile communication connection setup process that implements slotted UE transmissions, in accordance with embodiments of the present invention. In accordance with the embodiments shown in FIG. 3, the minimum time period 402 between UE transmissions, is a predetermined time period that is known to the UE 102 and the network (i.e., base stations 210 and 220) prior to the occurrence of the connection setup process. In this regard, the predetermined or fixed time period may be previously defined in a mobile communication standard or may otherwise have been previously communicated to the UE by other means. The means for the UE receiving the time period 402 may include, but are not limited to, communicated through a higher layer protocol, e.g., IMS (IP Multimedia Services); OMA (Open Mobile Alliance) Device Management protocol; the minimum time period of the previous mobile session (stored in UE 102 memory); a SIM (Subscriber Identity Module) card; user configuration (i.e., manual input). In addition the minimum time period may be defined with a protocol or standard based on device type, such that the minimum time period will vary based on device type.

In the illustrated embodiments of FIG. 3, the UE 102 transmits an initial UE transmission, i.e., access preamble 404 that includes an indicator signaling that is configured to request a slotted transmission setup procedure. In response to receiving the access preamble 404, the network (i.e., base station 210 or 220) will decide whether to allow the request (i.e., authorize slotted transmission processing) or deny the request. In certain instances scheduling in the network or other network factors may prohibit the network from granting the request to perform slotted transmission. If the network 210/220 grants the request for slotted transmissions, the response to the initial UE transmission, i.e., access response 406 will indicate authorization, i.e., "ack". Conversely, if the network 210/220 denies the request for slotted transmission, the access response 406 will indicate denial, i.e., "nack". In specific embodiments of the invention, in which the network is unaware of the minimum time period 402 prior to the network authorizing the request for slotted transmission, a subsequent transmission from the UE 102 to the network 210/220 will indicate the actual minimum time period 402.

Once the UE 102 has been authorized to perform slotted transmissions, the UE 102 provides for subsequent connection startup transmissions to be transmitted after the predetermined minimum time period 402 has elapsed. Specifically, the connection request 408 is not transmitted until the time period 402 has elapsed (i.e., the time since the access preamble 404 was transmitted) and, once the connection request 408 is transmitted, the session request 412 is not transmitted until the time period 402 has elapsed (i.e., the time since the connection request 408 was transmitted). It should be noted that the minimum time period 402 is not dependent upon the time at which the network responses are received by the UE 102 (i.e., the minimum time period 402 is not triggered by the UE receiving the access response 406 or the connection response 410. In specific embodiments of the invention a broadcasted signal from the network will provide information on the minimum time period 402. It should be noted that while the connection setup process of FIG. 3 implements three UE requests (access preamble 404, connection request 408 and session request 412) and corresponding network responses (access response 406, connection response 410 and session response 414) other signaling systems may implement more or less requests and responses (i.e., more or less slotted transmissions) and, as such, are within embodiments of the invention herein contemplated.

Referring to FIG. 4, a connection setup process messaging diagram 500 is depicted that illustrates a mobile communication connection setup process that implements slotted UE transmissions, in accordance with embodiments of the present invention. In accordance with the embodiments shown in FIG. 4, the minimum time period 502 between UE transmissions is controlled by the network 210/220. In this regard, the minimum time period 502 is defined by the network 210/220 in response to the initial request for slotted transmissions. As such, scheduling in the network or other network factors may be considered when determining the minimum time period that the network assigns to the UE 102.

In the illustrated embodiments of FIG. 4, the UE 102 transmits an initial UE transmission, i.e., access preamble 504 that includes an indicator signaling that is configured to request a slotted transmission setup procedure. In response to receiving the access preamble 504, the network (i.e., base station 210 or 220) will decide whether to allow the request (i.e., authorize slotted transmission processing) or deny the request. As previously discussed, in certain instances scheduling in the network or other network factors may prohibit the network from granting the request to perform slotted transmission. If the network 210/220 grants the request for slotted transmissions, the network 210/220 will determine the specific time value for the minimum time period, which may be dictated by current scheduling in the network or other relevant network factors and the response to the initial UE transmission, i.e., access response 506 will indicate authorization, i.e., "ack" and include the identified minimum time period 502. Conversely, if the network 210/220 denies the request for slotted transmission, the access response 506 will indicate denial, i.e., "nack".

Similar to the embodiments described in relation to FIG. 3, once the UE 102 has been authorized to perform slotted transmissions, the UE 102 provides for subsequent connection startup transmissions to be transmitted after the predetermined minimum time period 502 has elapsed. Specifically, the connection request 508 is not transmitted until the time period 502 has elapsed (i.e., the time since the access preamble 504 was transmitted) and, once the connection request 508 is transmitted, the session request 512 is not transmitted until the time period 502 has elapsed (i.e., the time since the connection request 508 was transmitted). It should be noted that the minimum time period 502 is not dependent upon the time at which the network responses are received by the UE 102 (i.e., the minimum time period 502 is not triggered by the UE receiving the access response 506 or the connection response 510. It should be noted that while the connection setup process of FIG. 4 implements three UE requests (access preamble 504, connection request 508 and session request 512) and corresponding network responses (access response 506, connection response 510 and session response 514) other signaling systems may implement more or less requests and responses and, as such, are within embodiments of the invention herein contemplated.

Referring to FIG. 5, a connection setup process messaging diagram 600 is depicted that illustrates a mobile communication connection setup process that implements slotted UE transmissions, in accordance with embodiments of the present invention. In accordance with the embodiments shown in FIG. 5, the minimum time period 602 between UE transmissions is requested by the UE. In this regard, a specified minimum time period ($\Delta Req$) 601 is requested by the UE 102 in the initial UE transmission 604 and, in responding to the initial UE transmission, the network 210/220 may choose to approve (i.e., use of the specified minimum time period 601 in the request), or the network may choose to provide a revised (i.e., different) minimum time period in the response. In such embodiments of the invention, the minimum time period 602 requested by the UE 102 may be determined based on the specific UE's capability to perform slotted transmissions in an optimal manner. As such, the UE may determine the minimum time period 602 based on the capacitor size of the UE, the type of battery implemented in the UE or other aspects of the UE. Additionally, the UE may determine the minimum time period 602 dynamically, immediately prior to initiating the connection setup process, based on dynamic features in the UE, such as the current charging level of the battery or the like or combinations of dynamic features and fixed features (e.g., capacitor type, battery type or the like).

In the illustrated embodiments of FIG. 5, the UE 102 transmits an initial UE transmission, i.e., access preamble 604 that includes an indicator signaling that is configured to request a slotted transmission setup procedure and includes a specific requested minimum time period 601. In response to receiving the access preamble 604, the network (i.e., base station 210 or 220) will decide whether to allow the request (i.e., authorize slotted transmission processing) or deny the request. As previously discussed, in certain instances scheduling in the network or other network factors may prohibit the network from granting the request to perform slotted transmission. If the network 210/220 grants the request for slotted transmissions, the network 210/220 will determine whether to allow the requested minimum time period 601 or whether to provide a revised/different minimum time period. The need to revise the requested minimum time period may be dictated by current scheduling in the network or other relevant network factors. The response to the initial UE transmission, i.e., access response 606 will indicate authorization, i.e., "ack" and the authorized minimum time period (Δ) 602, which is either the requested minimum time period 601 or the revised minimum time period. In the event that the network 210/220 approves the requested minimum time period, the access response 606 may be required to include the requested minimum time in the response or other, possibly implicit, indication thereof. Conversely, if the network 210/220 denies the request for slotted transmission, the access response 606 will indicate denial, i.e., "nack".

Similar to the embodiments described in relation to FIGS. 3 and 4, once the UE 102 has been authorized to perform slotted transmissions, the UE 102 provides for subsequent connection startup transmissions to be transmitted after the predetermined minimum time period 602 has elapsed. Specifically, the connection request 608 is not transmitted until the time period 602 has elapsed (i.e., the time since the access preamble 604 was transmitted) and, once the connection request 608 is transmitted, the session request 612 is not transmitted until the time period 602 has elapsed (i.e., the time since the connection request 608 was transmitted). It should be noted that the minimum time period 602 is not dependent upon the time at which the network responses are received by the UE 102 (i.e., the minimum time period 602 is not triggered by the UE receiving the access response 606 or the connection response 610. It should be noted that while the connection setup process of FIG. 5 implements three UE requests (access preamble 604, connection request 608 and session request 612) and corresponding network responses (access response 606, connection response 610 and session response 614) other signaling systems may implement more or less requests and responses and, as such, are within embodiments of the invention herein contemplated.

Thus, systems, apparatus, methods, computer program products and the like described above provide for requesting slotted UE transmissions during connection setup process. The slotted process, which requires a minimum time period between UE transmissions, allows for lower instantaneous current drain for battery powered UEs. As described above, the minimum time or slot period can be predefined, requested in the initial UE transmission or returned by the network in response to the initial UE transmission. As such, the present invention enables the use of lower cost battery solution in mobile UEs.

The invention is not limited to any particular types of devices (either Machine Type Communication (MTC) devices or non-MTC devices). As used herein, a device may also be referred to as a UE, a system, or apparatus. Examples of devices include mobile phones or other mobile computing devices, mobile televisions, laptop computers, smart screens, tablet computers or tablets, portable desktop computers, e-readers, scanners, portable media devices, gaming devices, cameras or other image-capturing devices, headgear, eyewear, watches, bands (e.g., wristbands) or other wearable devices, or other portable computing or non-computing devices.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory ("RAM") having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The various features described with respect to any embodiments described herein are applicable to any of the other embodiments described herein. As used herein, the terms data and information may be used interchangeably. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory ("ROM"), an erasable programmable read-only memory ("EPROM" or Flash memory), a compact disc read-only memory ("CD-ROM"), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for discontinuous transmissions in a mobile communication network, the method comprising:
   determining, at the UE, a requested minimum time for conducting slotted UE transmissions;
   transmitting, from user equipment (UE) to a mobile communication network, an initial UE transmission, prior to connection set-up, that includes (i) an indicator signal that is configured to request slotted UE transmissions and (ii) the requested minimum time;
   in response to transmitting the initial UE transmission, receiving, at the UE, a response that authorizes slotted UE transmissions and instructs the UE to (i) utilize the requested minimum time, or (ii) utilize a revised minimum time that is different than the requested minimum time; and
   in response to authorizing slotted UE transmission, slotting communication of each subsequent UE transmission including connection set-up transmission, wherein slotting requires a minimum time to elapse between each UE transmission.

2. The method of claim 1, further comprising, immediately prior to transmitting the initial UE transmission, dynamically determining the requested minimum time based on one or more of capacitor size, battery type, and current battery charging level.

3. The method of claim 1, wherein the initial UE transmission is an access preamble and wherein slotting requires the minimum time to elapse between transmission of the access preamble and a connection request and requires the minimum time to elapse between the connection request and a session request.

4. The method of claim 1, wherein slotting further requires a reception chain of the UE not to be deactivated during the minimum time period.

5. A user equipment (UE) apparatus for discontinuous transmissions during a mobile communication network, the apparatus comprising:
   a memory;
   a processor in communication with the memory; and
   a transmission module stored in the memory, executable by the processor, and configured to:
      determine a requested minimum time for conducting slotted UE transmissions;
      transmit, to a mobile communication network, an initial UE transmission, prior to connection set-up, that includes (i) an indicator signal that is configured to request slotted UE transmissions and (ii) the requested minimum time;

in response to transmitting the initial UE transmission, receive, a response to the initial UE transmission that authorizes slotted UE transmissions and instructs the UE to (i) utilize the requested minimum time, or (ii) utilize a revised minimum time that is different than the requested minimum time; and in response to being authorized for slotted UE transmission, slot communication of each subsequent UE transmission including connection set-up transmission, wherein slotting requires a minimum time to elapse between each UE transmission.

6. The apparatus of claim 5, wherein the transmission module is further configured to dynamically determine, immediately prior to transmitting the UE initial transmission, the requested minimum time based on one or more of capacitor size, battery type, and current battery charging level.

7. The apparatus of claim 5, wherein the transmission module is further configured to transmit the initial UE transmission defined as an access preamble and wherein slotting requires the minimum time to elapse between transmission of the access preamble and a connection request and requires the minimum time to elapse between the connection request and a session request.

8. The apparatus of claim 5, wherein slotting further requires a reception chain of the UE not to be deactivated during the minimum time period.

9. A mobile communication network system for discontinuous transmissions during a mobile communication network, the system comprising:

a user equipment (UE) terminal comprising a first memory, a first processor in communication with the first memory and a transmission module stored in the first memory, executable by the first processor and configured to determine a requested minimum time for conducting slotted UE transmissions, transmit an initial UE transmission, prior to connection set-up, that includes an indicator signal that is configured to request slotted UE transmissions and (ii) the requested minimum time; and a base station apparatus comprising a second memory and second processor in communication with the second memory and configured to, in response to receiving the initial UE transmission, signal a response that authorizes slotted UE transmissions and instructs the UE to (i) utilize the requested minimum time, or (ii) utilize a revised minimum time that is different than the requested minimum time, wherein, in response to the UE terminal receiving the response, the transmission module is configured to slot communication of each subsequent UE transmission including connection set-up transmission, wherein slotting requires a minimum time to elapse between each UE transmission.

10. The system of claim 9, wherein the transmission module is further configured to dynamically determine, immediately prior to transmitting the initial UE transmission, the requested minimum time based on one or more of capacitor size, battery type, and current battery charging level.

11. The system of claim 9, wherein slotting further requires a reception chain of the UE not to be deactivated during the minimum time period.

* * * * *